United States Patent [19]
Eckroth

[11] Patent Number: 5,687,980
[45] Date of Patent: Nov. 18, 1997

[54] FOLDABLE BICYCLE TRAILER

[76] Inventor: Lee Eckroth, 8721 Lianna Ct., Stockton, Calif. 95209

[21] Appl. No.: 508,123

[22] Filed: Jul. 27, 1995

[51] Int. Cl.$^6$ ................................................. B62B 3/02
[52] U.S. Cl. ........................... 280/204; 280/644; 280/42; 280/656
[58] Field of Search ..................... 280/202, 204, 280/292, 400, 491.1, 639, 644, 645, 646, 647, 656, 42; 296/95.1, 27; 160/370.21, DIG. 2, DIG. 3

[56] References Cited

U.S. PATENT DOCUMENTS

| | | | |
|---|---|---|---|
| 3,650,559 | 3/1972 | Powers | 296/95.1 |
| 3,734,528 | 5/1973 | Echols, Jr. | 280/42 |
| 4,037,853 | 7/1977 | Sparks . | |
| 4,529,220 | 7/1985 | Wright et al. . | |
| 4,614,352 | 9/1986 | Cervantes . | |
| 4,669,743 | 6/1987 | Tipke | 280/42 |
| 5,020,814 | 6/1991 | George et al. . | |
| 5,261,683 | 11/1993 | Kurdziel | 280/204 |
| 5,267,744 | 12/1993 | Berry et al. . | |
| 5,308,096 | 5/1994 | Smith . | |
| 5,460,395 | 10/1995 | Chen | 280/204 |

FOREIGN PATENT DOCUMENTS 871580  4/1942  France ................................. 280/204

*Primary Examiner*—Victor E. Johnson
*Attorney, Agent, or Firm*—Michael I. Kroll

[57] ABSTRACT

An improved foldable bicycle trailer including a foldable frame. A pair of wheels are permanently mounted in a rotatable manner to the foldable frame. The foldable frame with the wheels can fold up for storage.

13 Claims, 3 Drawing Sheets

FOLDABLE BICYCLE TRAILER

BACKGROUND OF THE INVENTION

1. Field of the Invention

The instant invention relates generally to bicycle tow carts and more specifically it relates to an improved foldable bicycle trailer.

2. Description of the Prior Art

Numerous bicycle tow carts have been provided in prior art. For example, U.S. Pat. No. 4,037,853 to Sparks; U.S. Pat. No. 4,529,220 to Wright et al.; U.S. Pat. No. 4,614,352 to Cervantes; U.S. Pat. No. 5,020,814 to George et al.; U.S. Pat. No. 5,267,744 to Berry et al. and U.S. Pat. No. 5,308,096 to Smith all are illustrative of such prior art. While these units may be suitable for the particular purpose to which they address, they would not be as suitable for the purposes of the present invention as heretofore described.

SPARKS, CARL K.

DELIVERY BICYCLE-TRAILER

U.S. Pat. No. 4,037,853

A delivery trailer adapted to alternatively be pulled by a bicycle, to be operated as a hand truck or to be collapsed for compact mounting upon the bicycle when not in use. In order to adapt the bicycle-trailer combination for carrying substantial loads, the bicycle has a structural portion of its frame extending rearwardly above its back wheel to provide a mount for the trailer. The collapsible trailer includes a parallelogram linkage with associated bracing as well as other features to adapt it for carrying heavy loads.

WRIGHT, JOHN O.

HYDE, WILLIAM

TRAILERS

U.S. Pat. No. 4,529,220

A trailer comprising a load bearing section, a wheel carrying assembly and a draw bar. The load bearing section and the wheel carrying assembly are relatively displaceable between a conventional towing position and a position in which the wheel carrying assembly supports the trailer in a substantially vertical disposition for stowage.

CERVANTES, MOSES

FOLDABLE BICYCLE CART

U.S. Pat. No. 4,614,352

A central longitudinal towing tongue is provided as well as a front-to-rear extending opposite side wheel support frame spaced laterally outwardly of the opposite sides of the rear end portion of the tongue. Front and rear transverse frame members extend and are pivotally connected between the front and rear ends of the wheel frames. The longitudinal midporton of the tongue includes a sliding pivot connection with the central portion of the front frame member. The tongue and front frame member are relatively oscillatable about a vertical axis. The tongue may be shifted longitudinally relative to that axis. The rear end of the tongue and the longitudinal midportion of the rear transverse frame member include a coacting structure. The rear end of the tongue may be releasably anchored to the longitudinal midportion of the rear transverse frame member. The wheel support frames and the front and rear transverse frame members define a parallelogram linkage. The forward end of the tongue is equipped with a hitch construction for releasable connection to the rear of a bicycle.

GEORGE, DONALD A.

BERRY, PETER B.

CREPS, BRUCE W.

ROLES, GERALDINE C.

COLLAPSIBLE BICYCLE TRAILER

U.S. Pat. No. 5,020,814

A collapsible bicycle trailer includes a rigid chassis frame, hinged side rails, a side rail locking bar, a hinged tongue, and quick release wheels. The chassis frame has a generally rectangular-shaped outer frame member, and inner frame members spaced inwardly from and parallel to, the sides of the outer frame member, with wheels rotating between the outer and inner frame members. On each side of the chassis frame are positioned a pair of side rail hinge members to which are attached the lower ends of the side rails which rotate between an extended, vertical position and a folded horizontal position. The side rail hinge members also are designed to provide the connecting means between the outer and inner frame members. A side rail locking bar is pivotally attached to the top of one side rail and unfolds to securely connect to the top of the other side rail, forming a roll bar assembly. Extending forward from a front corner of the chassis frame is a tongue, having at its outer end a hitch for attaching the trailer to a bicycle. A pivot shaft is mounted between a side of the outer frame member and an inner frame member to pivotally support the inner end of the tongue, allowing the tongue to be folded 180-degrees to a position beneath and adjacent to the chassis frame. A U-shaped tongue clip, with securing pin penetrating its downwardly extending legs, is installed on the outer frame member to grasp and secure the trailer tongue in an open, extended position.

BERRY, PETER B.

CREPS, BRUCE W.

GEORGE, DONALD A.

RUSSELL, EDWARD F.

STROLLER WHEEL ASSEMBLY FOR BICYCLE TRAILER

U.S. Pat. No. 5,267,744

A stroller wheel assembly is mounted on a bicycle trailer tongue to permit operation as either a trailer or a separate three-wheel stroller. A clamping member, attached to the tongue of the trailer, includes a boss which extends transversely outward. A mating socket is provided on a pivot member. The pivot member is attached to a fork which rotationally supports a wheel. The preferred shape of the boss and mating socket is an equilateral triangle. The triangular socket of the pivot member engages the triangular boss of the clamping member in two positions, one with the wheel in the down position for stroller use and the other with the wheel in a rearward position for bicycle trailer use. Centrally fixed to and extending outwardly from the triangular boss is a threaded member which acts as a axis for rotation of the pivot member between the two positions. A spring encloses the threaded member between the boss and the socket, thus biasing the boss out of the socket to facilitate relocation of the pivot member. The threaded member is inserted through an aperture formed in the socket. A threaded knob, upon tightening, pulls the boss into the socket, thereby locking the wheel into the desired position. An upwardly inclined plate, attached to the front portion of the pivot member, physically interferes with and deflects the hitch when the wheel is in the down, stroller position, thus preventing inadvertent use of the wheel in the down, stroller position while hitched to the bicycle.

SMITH, GILBERT

BICYCLE TRAILER

U.S. Pat. No. 5,308,096

A trailer for towing behind a bicycle has a trailer body with a floor, side walls, front and rear walls, and an open top. A removable top cover is for covering the open top. A pair of seats are located in the body, side by side with one another. A rigid chassis supports the body, to which the tow bar and wheels are mounted. A tow bar extending forwardly of the front wall is moveably attached to the chassis for connection to a bicycle. A pair of rod wheels are releasably attached to the chassis. Attachments are for securing the body to an automobile roof to adapt the body for use as an automobile luggage carrier.

SUMMARY OF THE INVENTION

A primary object of the present invention is to provide an improved foldable bicycle trailer that will overcome the shortcomings of the prior art devices.

Another object is to provide an improved foldable bicycle trailer in which the frame for supporting a nylon covering that protects children and cargo can fold up for storage without having to remove the wheels.

An additional object is to provide an improved foldable bicycle trailer in which the tow bar extending from the frame contains a hitch that is capable of attaching to the rear axle of every type of bicycle.

A further object is to provide an improved foldable bicycle trailer that is simple and easy to use.

A still further object is to provide an improved foldable bicycle trailer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
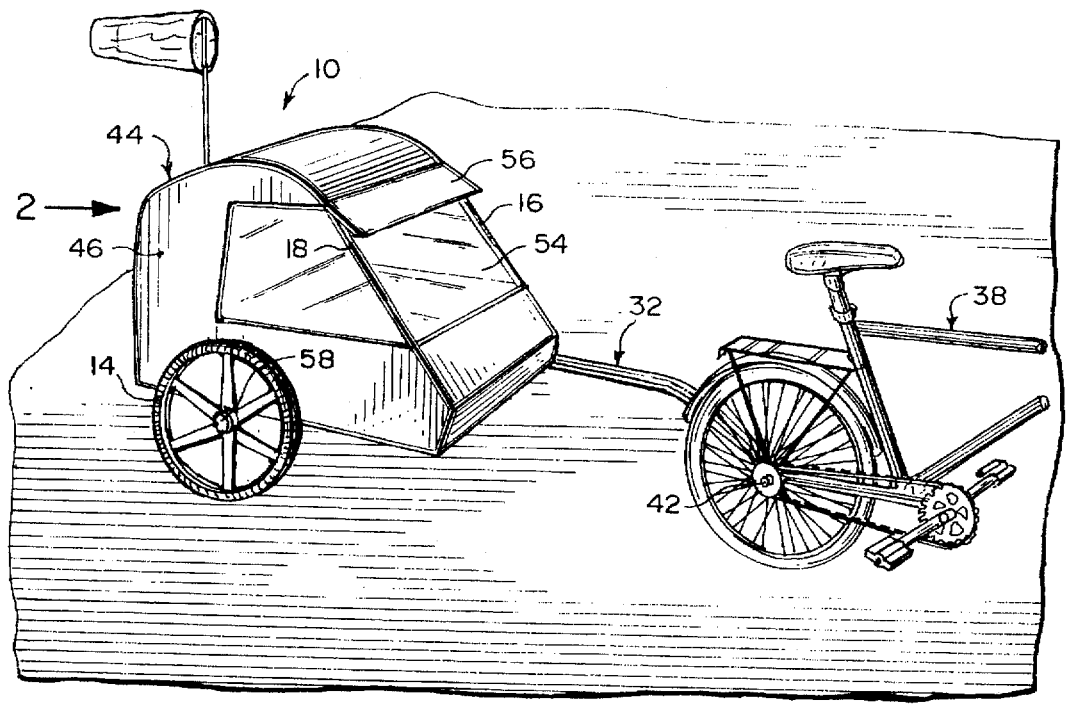
FIG. 1 is a front perspective view, showing the instant invention being towed by a bicycle in which the front portion of the bicycle is broken away.

Turning now descriptively to the drawings, in which similar reference characters denote similar elements throughout the several views, FIGS. 1 through 8 illustrate an improved foldable bicycle trailer 10 comprising a foldable frame 12. A pair of wheels 14 are permanently mounted in a rotatable manner to the foldable frame 12. The foldable frame 12 with the wheels 14 can fold up for storage.

Figure 3:
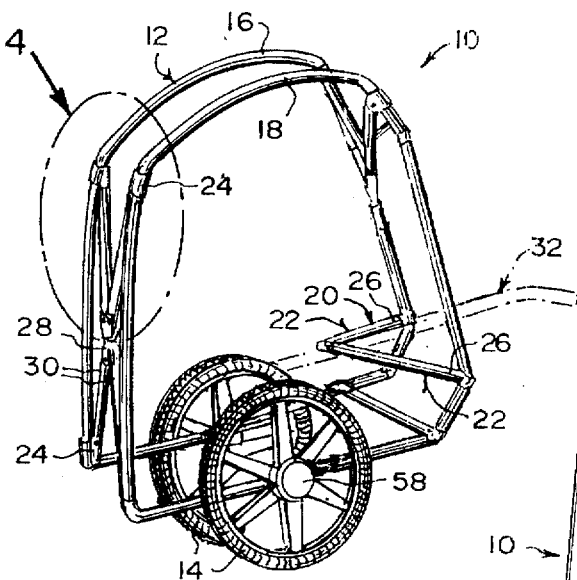
FIG. 3 is a rear perspective view, showing the frame in a folded position.

The foldable frame 12 includes a pair of continuous looped side rails 16 and 18. A plurality of collapsible crossbars 20 extend between the side rails 16 and 18. When the crossbars 20 are collapsed, the side rails 16 and 18 will move towards each other for storage, as shown in FIGS. 3 and 4.

Figure 4:
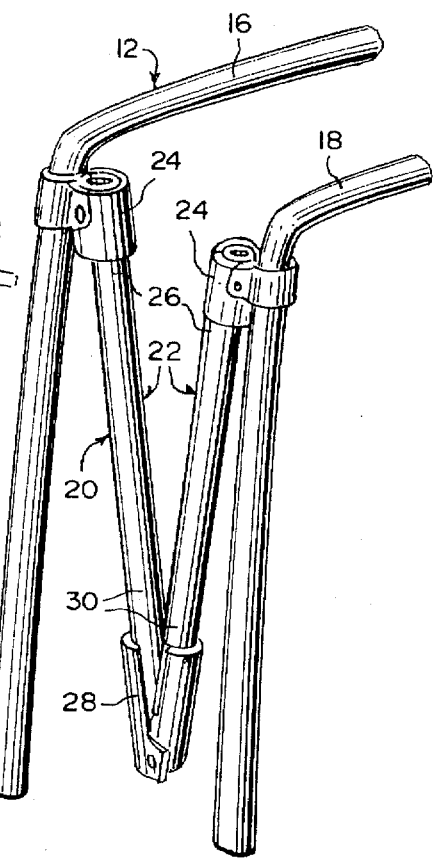
FIG. 4 is an enlarged perspective view of a back portion of the frame as indicated by arrow 4 in FIG. 3, showing one of the crossbars in the folded position with its lock latch disengaged.

Each crossbar 20, as best seen in FIG. 4, consists of two pipes 22 of equal length. A pair of hinge mounts 24 are provided. Each hinge mount 24 connects a first end 26 of one pipe 22 to one side rail 16 or 18. A latch lock 28 is attached between abutting second ends 30 of the pipes 22. When the side rails 16 and 18 are unfolded, the latch lock 28 will maintain the pipes 22 in their extended position between the side rails 16 and 18 (see FIG. 6).

Figure 8:
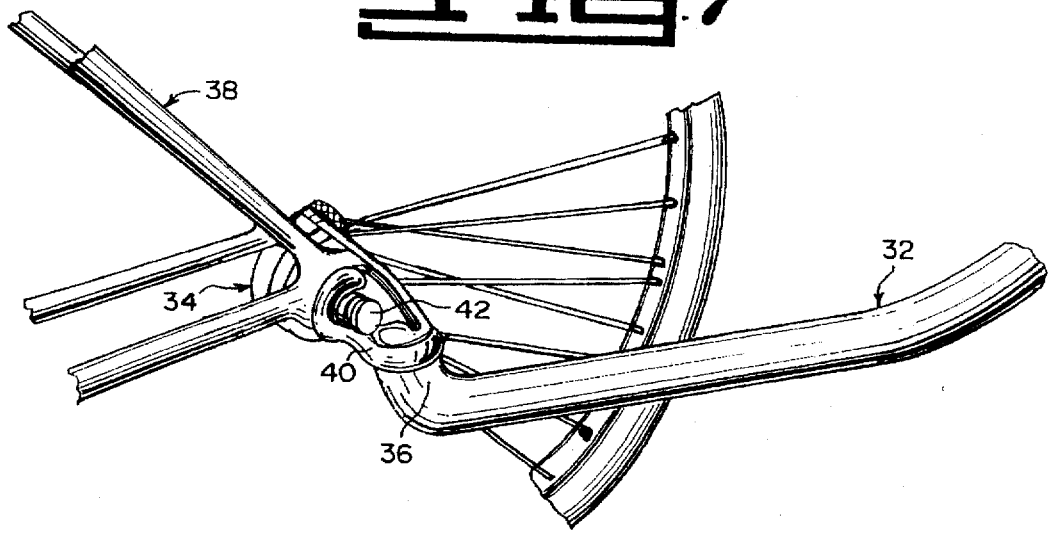
FIG. 8 is a perspective view of the coupling structure with parts broken way.

A tow bar 32 is affixed to an extends forwardly from the foldable frame 12. A structure 34 on a distal free end 36 of the tow bar 22 is for coupling the tow bar 32 to a bicycle 38. The coupling structure 34, as best seen in FIG. 8, is a hitch 40 for connecting the distal free end 36 of the tow bar 32 to a rear axle 42 of the bicycle 38.

Figure 2:
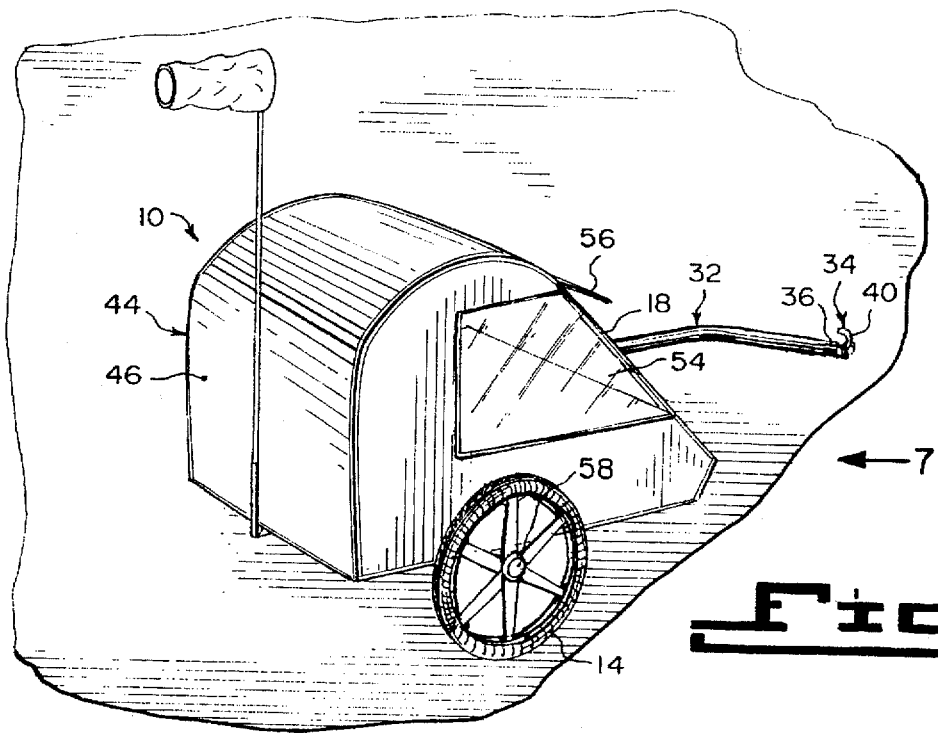
FIG. 2 is a rear perspective view of the instant invention per se taken in the direction of arrow 2 in FIG. 1.
Figure 7:
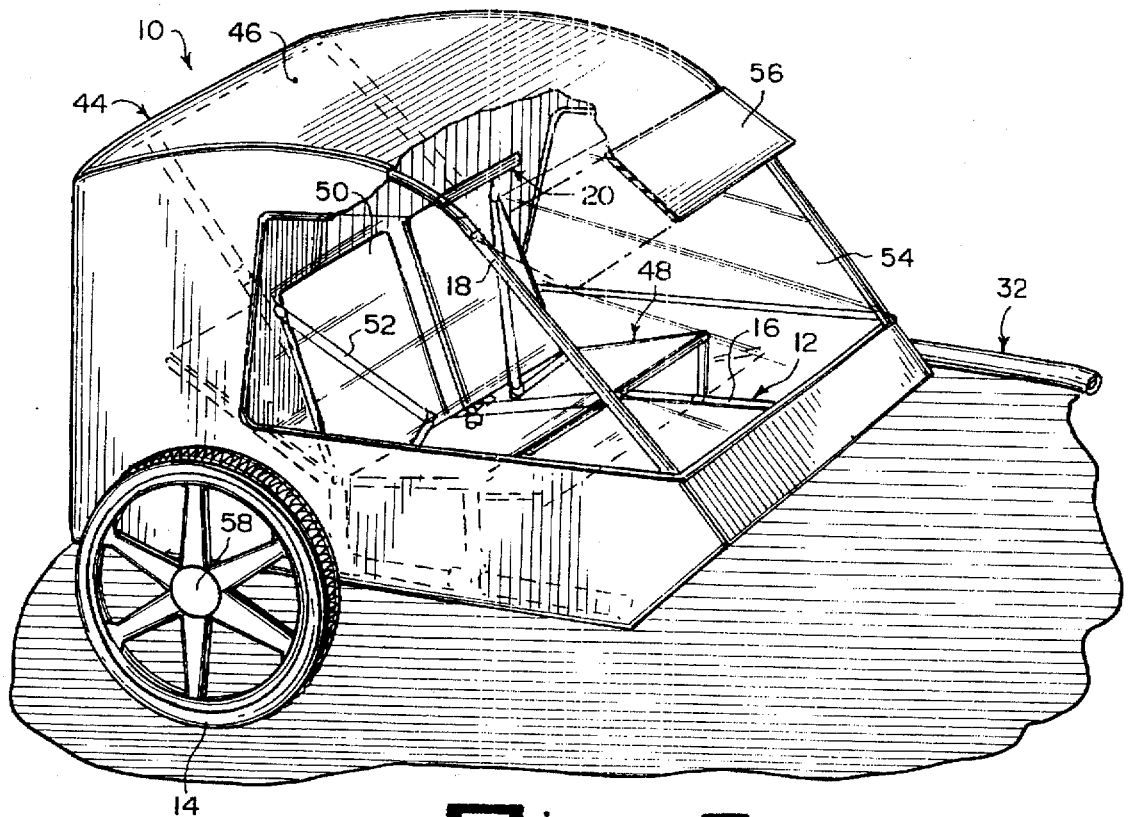
FIG. 7 is an enlarged perspective view of the instant invention with parts broken away.

A flexible covering 44, as shown in FIGS. 1, 2 and 7, is carried on the foldable frame 12. The flexible covering 44 is fabricated out of nylon material 46.

As shown in FIG. 7, a pair of removable seats 48 are connected to the foldable frame 12. The seats 48 face forward, so that two children can sit on the seats 48 and be protected by the flexible covering 44. Each seat 48 includes an adjustable backrest 50. The backrest 50 can be positioned in any angle for the comfort of the child sitting in the seat 48. Each seat 48 also contains a harness 52 to safely retain the child thereto.

The flexible covering 44 includes a wrap around clear plastic window 54 that faces forward, so that any child sitting on one seat 48 can look out of the window 54. A removable visor 56 is mounted over the window 54, so as to block any harmful rays of the sun from entering the window 54.

Figure 5:
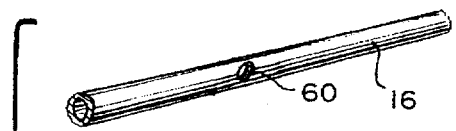
FIG. 5 is a perspective view of the lower portion of the frame having mounting holes for the wheels which are permanently secured thereto.
Figure 6:
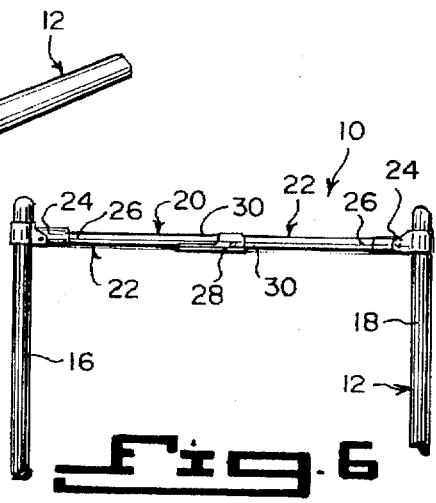
FIG. 6 is a rear elevational view of the back portion of the frame, showing the crossbar in an unfolded position with its lock latch engaged.

As shown in FIGS. 1, 2, 3 and 7, each wheel 14 contains an axle 58. Each axle 58 is connected through a hole 60 in the side rails 16 and 18, as shown in FIG. 5. The wheels 14 do not have to be removed when the side rails 16 and 18 are moved towards each other for storage.

OPERATION OF THE INVENTION

To use the improved foldable bicycle trailer 10, the following steps should be taken:

1. Open the window 54 in the flexible covering 44.
2. Adjust each backrest 50 on each seat 48.
3. Place a child into each seat 48.
4. Lock each harness 52 in place on each seat 48, to keep the children safely retained.
5. Insert cargo behind the seats 48 if necessary.
6. Couple the hitch 40 to the rear axle 42 of the bicycle 38.

To store the improved foldable bicycle trailer 10, the following steps should be taken:

1. Uncouple the hitch 40 from the rear axle 42 of the bicycle 38.
2. Remove the cargo from behind the seats 48.
3. Unlock each harness 52 on each seat 48.
4. Take each child out of each seat 48.
5. Disengage he removable visor 56 therefrom.
6. Remove the flexible covering 44 with the window 54 from the foldable frame 12.
7. Withdraw the seats 48 from the foldable frame 12.
8. Collapse all of the crossbars 20.
9. Move the side rails 16 and 18 with their respective wheels 14 towards each other for storage.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved foldable bicycle trailer comprising:
   a) a foldable frame;
   b) a pair of wheels permanently mounted in a rotatable manner to said foldable frame, whereby said foldable frame with said wheels can fold up for storage;
   c) a flexible covering to be carried by said foldable frame, said flexible covering including a wraparound clear plastic window that faces forward, so that a seated child can look out of said window, and a removable visor mounted over said window, so as to block any harmful rays of the sun from entering said window; and
   d) a pair of removable seats connected to said foldable frame, whereby said seats face forward, so that two children can sit on said seats and be protected by said flexible covering.

2. An improved foldable bicycle trailer as recited in claim 1, wherein said foldable frame includes:
   a) a pair of continuous looped side rails; and
   b) a plurality of collapsible crossbars extending between said side rails, so that when said crossbars are collapsed said side rails will move towards each other for storage.

3. An improved foldable bicycle trailer as recited in claim 2, wherein each said crossbar includes:
   a) two pipes of equal length;
   b) a pair of hinge mounts, in which each said hinge mount connects a first end of one said pipe to one said side rail; and
   c) a latch lock attached between abutting second ends of said pipes, so that when said side rails are unfolded, said latch lock will maintain said pipes in an extended position between said side rails.

4. An improved foldable bicycle trailer as recited in claim 3, further including:
   a) a tow bar affixed to and extending forwardly from said foldable frame; and
   b) means on a distal free end of said tow bar, for coupling said tow bar to a bicycle.

5. An improved foldable bicycle trailer as recited in claim 4, wherein said coupling means is a hitch for connecting the distal free end of said tow bar to a rear axle of the bicycle.

6. An improved foldable bicycle trailer as recited in claim 5, wherein said flexible covering is fabricated out of nylon material.

7. An improved foldable bicycle trailer as recited in claim 6, wherein each said seat includes an adjustable backrest, so that said backrest can be positioned in any angle for the comfort of the child sitting in said seat.

8. An improved foldable bicycle trailer as recited in claim 7, wherein each said seat includes a harness to safely retain the child thereto.

9. An improved foldable bicycle trailer as recited in claim 1, further including:
   a) a tow bar affixed to and extending forwardly from said foldable frame; and
   b) means on a distal free end of said tow bar, for coupling said tow bar to a bicycle.

10. An improved foldable bicycle trailer as recited in claim 9, wherein said coupling means is a hitch for connecting the distal free end of said tow bar to a rear axle of the bicycle.

11. An improved foldable bicycle trailer as recited in claim 6, wherein said flexible covering is fabricated out of nylon material.

12. An improved foldable bicycle trailer as recited in claim 1, wherein each said seat includes an adjustable backrest, so that said backrest can be positioned in any angle for the comfort of the child sitting in said seat.

13. An improved foldable bicycle trailer as recited in claim 1, wherein each said seat includes a harness to safely retain the child thereto.

* * * * *